United States Patent [19]

Chikuma

[11] Patent Number: 5,072,437
[45] Date of Patent: Dec. 10, 1991

[54] OPTICAL INFORMATION REPRODUCING APPARATUS

[75] Inventor: Kiyofumi Chikuma, Saitama, Japan

[73] Assignee: Pioneer Electronic Corporation, Tokyo, Japan

[21] Appl. No.: 483,697

[22] Filed: Feb. 23, 1990

Related U.S. Application Data

[63] Continuation-in-part of Ser. No. 338,075, Apr. 14, 1989, abandoned.

[30] Foreign Application Priority Data

Sep. 19, 1988 [JP] Japan .................................. 63-234032
Jun. 19, 1989 [JP] Japan .................................. 1-156203

[51] Int. Cl.$^5$ .............................................. G11B 7/18
[52] U.S. Cl. .................................................... 369/118
[58] Field of Search ............ 369/118, 124, 112, 44.24, 369/107

[56] References Cited

U.S. PATENT DOCUMENTS

| | | | |
|---|---|---|---|
| 4,357,533 | 11/1982 | Winslow | 369/44.24 |
| 4,517,666 | 5/1985 | Ando | 369/118 |
| 4,682,316 | 7/1987 | Tateoka et al. | 369/44.24 |

FOREIGN PATENT DOCUMENTS 1-293326 11/1989 Japan .

Primary Examiner—Donald McElheny, Jr.
Attorney, Agent, or Firm—Sughrue, Mion, Zinn, Macpeak & Seas

[57] ABSTRACT

To prevent a drop in signal level at high spatial frequencies, an optical information reproducing apparatus retrieves the primary output of light reflected from the surface of a recording medium. In the different embodiments of the invention, either a shield plate with a pinhole in the path of the light is provided, or a photodetector having a plurality of light-receiving elements is provided, a selection circuit being connected to the elements and selecting the highest output thereof.

7 Claims, 7 Drawing Sheets

OPTICAL INFORMATION REPRODUCING APPARATUS

This is a continuation-in-part application of U.S. Ser. No. 07/338,075 filed Apr. 14, 1989 abandoned.

BACKGROUND OF THE INVENTION

The present invention relates to an optical information reproducing apparatus suitable for use in such equipment as an optical video disk player or a digital audio disk player.

A conventional optical information reproducing apparatus is shown in FIG. 1A. A light beam issuing from a light source 1 such as a laser diode is reflected from a beam splitter 2 and converged by an objective lens 3 to form a small spot of information detecting light on the recording surface of a disk 4. The reflected light from the recording surface of the disk 4 becomes an optical signal carrying the information recorded as a recess (pit) in the disk 4. This optical signal passes through the objective lens 3 and beam splitter 2 in succession to a photodetector 5, where the optical signal is converted to an electrical signal to reproduce the recorded information. The objective lens 3 is driven with an actuator 6 in two mutually perpendicular directions, one being parallel to the recording surface of the disk 4, and the other being perpendicular to that surface. The lens 3 is controlled such that its focal point will coincide with the recording surface of the disk 4, whereas the spot of information detection light will be positioned on a track on the recording surface of the disk 4. In the system of FIG. 1A, the optical unit is functionally equivalent to a non-confocal optical unit as shown in FIG. 1B.

As described by H. H. Hopkins in his article entitled "Diffraction Theory of Laser Read-out System for Optical Video Disk" (J.O.S.A., Vol. 69, No. 1, January 1979), the conventional apparatus shown in FIG. 1A has incoherent transmission characteristics with respect to the spatial frequency of the information recorded in the disk, and has suffered from the disadvantage that the level of a signal detected becomes low at a high spatial frequency, as illustrated in FIG. 2. Further, no output signal is detected at higher spatial frequency so that it is impossible to detect the information recorded in the disk.

SUMMARY OF THE INVENTION

An object of the present invention is to provide an optical information reproducing apparatus that will not experience a drop in signal level at an increased spatial frequency.

In order to attain this object, the optical information reproducing apparatus of the present invention provides a shield plate having a small hole in the path of light from a recording medium to the photodetector in the vicinity of a point conjugative with the point at which the light from a light source is converged on the recording surface of the recording medium.

It is effective for the purposes of the present invention to provide light wavelength converting means by which the light emitted from the light source to illuminate said recording medium is converted to light having one half the wavelength of said emitted light.

A second harmonics generating (SHG) of a fiber type is advantageously used as said light wavelength converting means.

In a presently preferred embodiment, an objective lens used to converge the reflected light from the recording medium has a smaller light transmittance in the central portion than in the remaining area.

The above-stated object of the present invention can also be attained by employing a photodetector that comprises a plurality of light-detecting elements having a plurality of light-receiving surface arrayed in a predetermined direction, and a selection circuitry that selectively produces an output having the highest level of the outputs from said plurality of light-detecting elements.

DESCRIPTION OF PREFERRED EMBODIMENTS

Embodiments of the present invention now will be described in detail with reference to FIGS. 3A–11.

Figure 3A:
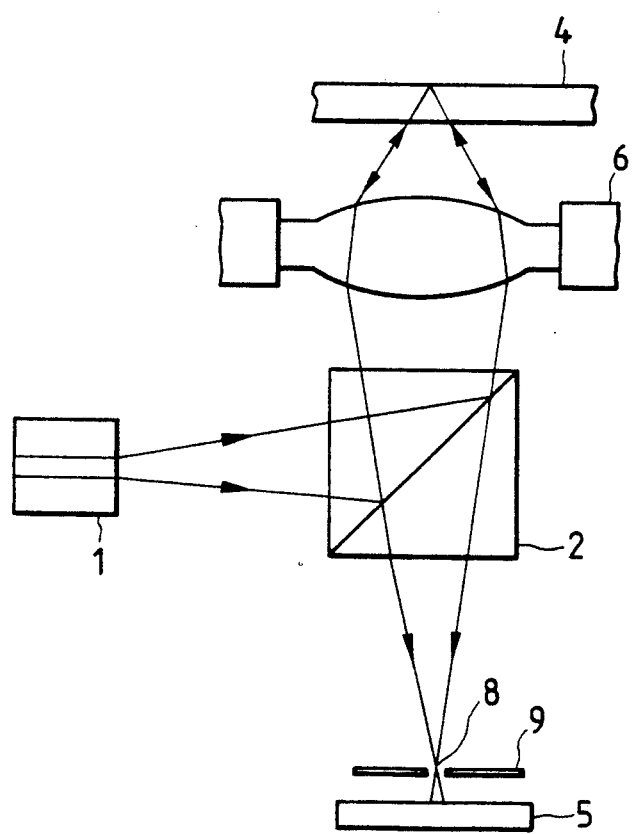
FIGS. 3A and 3B are schematic diagram showing optical information reproducing apparatus according to first embodiment of the present invention.

FIG. 3A is a schematic diagram of an optical information reproducing apparatus according to first embodiment of the present invention. In this apparatus, a light source 1, a beam splitter 2, an objective lens 3, a disk 4, a photodetector 5 and an actuator 6 are disposed in the same way as in the apparatus shown in FIG. 1A. According to the present invention, however, a shield plate 9 having a small throughhole 8 (hereinafter referred to as a pinhole) in the vicinity of a point B conjugative or co-linear with point A at which a spot of information detecting light is formed on the recording surface of the disk 4 is provided between the beam splitter 2 and the photodetector 5.

Figure 1A:
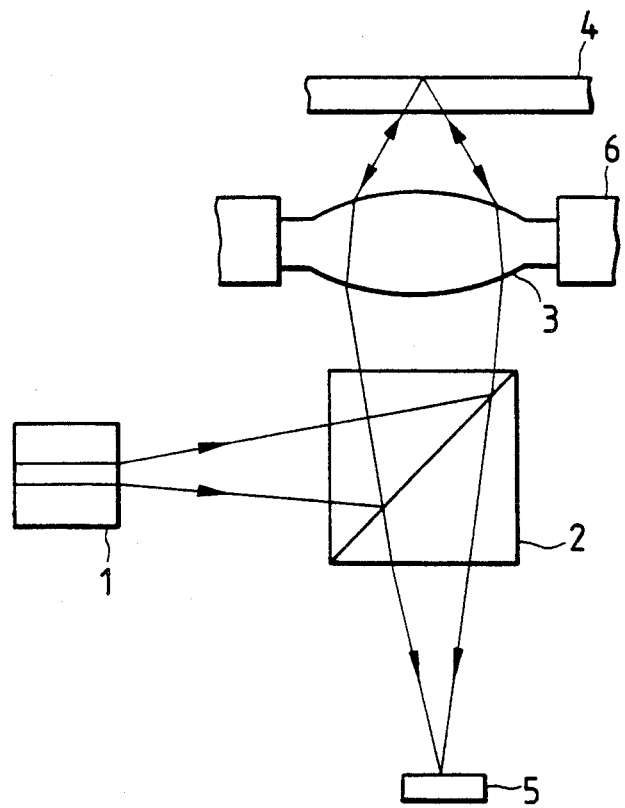
FIGS. 1A and 1B are schematic diagrams showing a conventional optical reproducing apparatus.
Figure 1B:
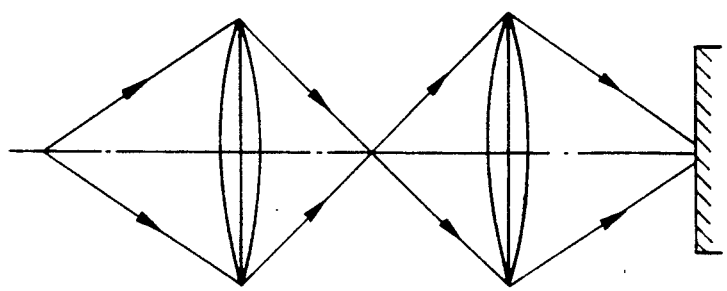
Figure 2:
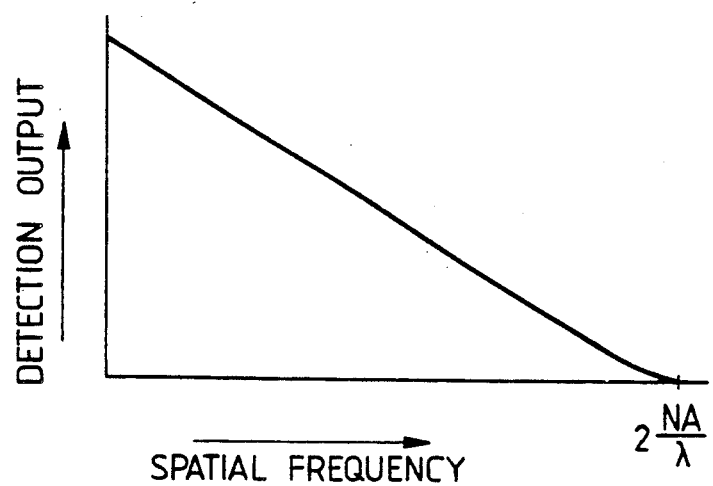
FIG. 2 is a graph showing the relationship between the readout output of the apparatus shown in FIGS. 1 and spatial frequency.
Figure 4:
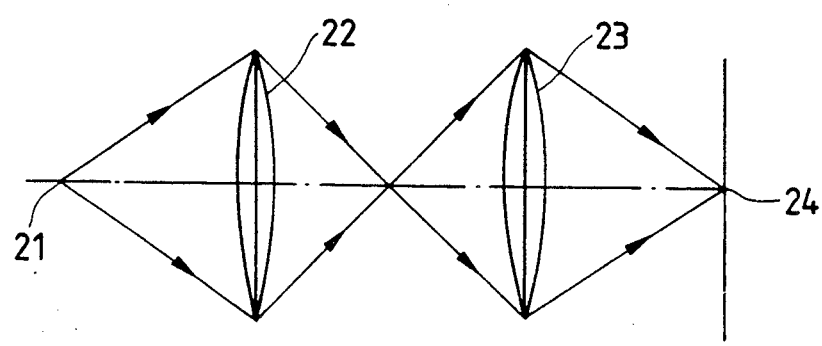
FIG. 4 is a schematic diagram showing a confocal optical unit.

In the system of FIG. 1A, the optical unit composed of the light source 1, beam splitter 2 and, objective lens 3 is functionally equivalent to a confocal optical unit as shown schematically in FIG. 4, in which the light emanating from a point source 21 passes through two convex lenses 22 and 23 to be converged to form a point image on the light-receiving surface of a point detector 24.

Figure 5:
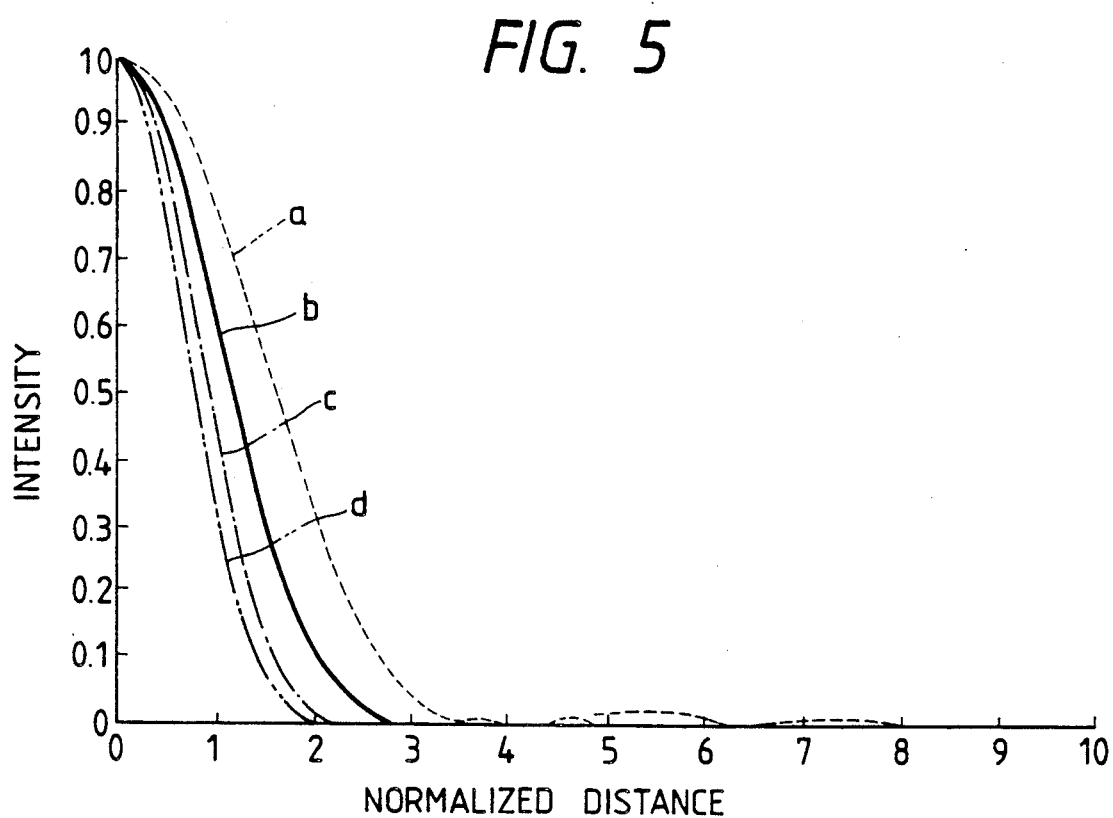
FIGS. 5 and 6 are graphs showing various types of light intensity distributions that are obtained by illuminating the recording surface of a disk with a laser beam.

With an ordinary non-confocal optical unit of the type shown in FIG. 3A, the distribution of light intensity of the point image obtained is proportional to $\{J_1(cz)/(cz)\}^2$, where $J_1(z)$ is a Bessel function and draws the curve shown by dashed line a in FIG. 5. With the confocal optical unit shown in FIG. 5, the distribution of light intensity of the point image obtained is proportional to $\{J_1(cz)/(cz)\}^4$ and draws the curve shown by solid line b in FIG. 5. Thus, in the apparatus shown in FIG. 3A having a confocal optical unit, information can be read out with a small spot of information detecting light, thereby increasing image resolution and the output level of readout signal. In FIG. 5, one-long-and-one-short dashed line c depicts the distribution of light intensity obtained with a confocal optical unit in which one of the two lenses is designed to have a smaller light transmittance in the central portion than in the remaining area (i.e., one lens is subjected to apodization), and one-long-and-two-short dashed line d depicts the distribution of light intensity in the case where both lenses are subjected to apodization.

Figure 6:
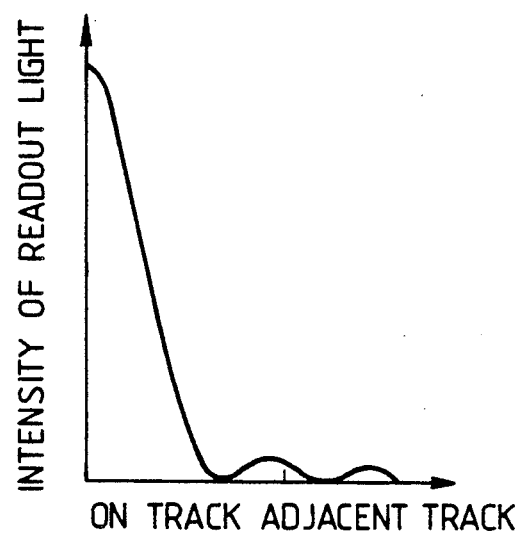

The light beam converged on the disk 4 is in the form of a "Airy disk" and the light in the neighborhood of a beam spot formed on the recording surface of the disk 4 has an intensity distribution as shown in FIG. 6, from which it can be seen that the intensity of light in the neighborhood of the center of the beam spot is the highest, producing a marked projection (main lobe) in the intensity distribution curve. The main lobe is surrounded by more than one side lobe, which causes crosstalk by reading information from adjacent tracks. According to the present invention, the shield plate 9 having pinhole 8 blocks that portion of reflected light from the disk 4 which corresponds to the side lobes, thereby eliminating the unwanted component of light which would otherwise cause crosstalk in readout signal. Consequently, the apparatus shown in FIG. 3A which adopts a confocal optical unit is capable of producing output signals that suffer from only minimal crosstalk between adjacent tracks.

Figure 3B:
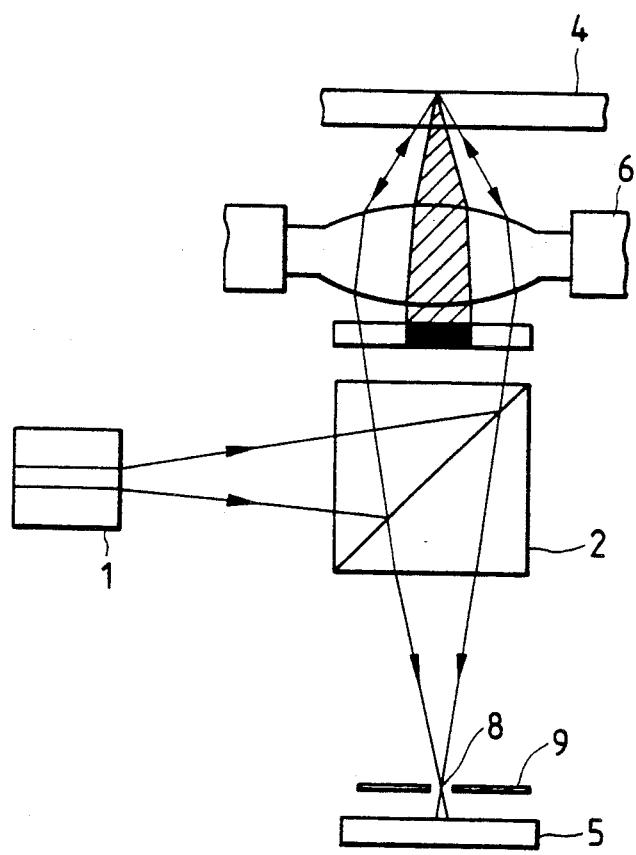

The objective lens 3 used in the apparatus shown in FIG. 3A may be such that it has a smaller light transmittance in the central portion than in the remaining area. Alternatively, an optical component that suppresses luminous flux in the central portion of the light beam may be disposed in the optical path between the objective lens 3 and the beam splitter 2 as shown in FIG. 3B. In either method, the diameter of information detecting light beam is further reduced, thereby improving image resolution and preventing the attenuation of the output signal level at an increased spatial frequency.

An attempt has been made already to provide improved readout performance by blocking the central portion of an objective lens without using a confocal optical unit. This approach is effective in reducing the diameter of information detecting light beam but on the other hand, the luminous flux of light corresponding to side lobes is so much increased as to either reduce the output signal level at a low spatial frequency or increase crosstalk. These problems are eliminated from the apparatus shown in FIGS. 3A and 3B, in which the shield plate 9 having pinhole 8 effectively blocks that portion of reflected light from the disk 4 which corresponds to side lobes.

Figure 7:
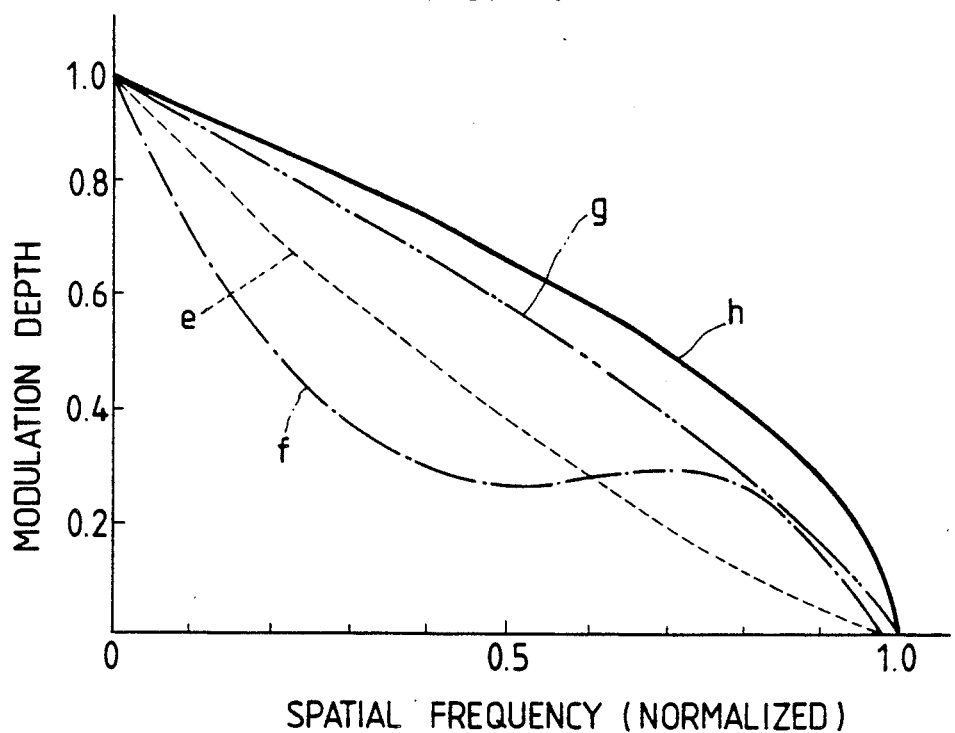
FIGS. 7 is a graph showing the relationship between readout output and spatial frequency.

The prior art shown in FIG. 1A has output characteristics as shown by dashed line f in FIG. 7, and an apparatus that employs an "apodized" objective lens in place of a confocal optical unit has output characteristics as shown by one-short-and-one-long dashed line f in FIG. 7. These may be contrasted with the output characteristics of the apparatus shown in FIG. 3A which are shown by two-short-and-one-long dashed line g, as well as with the curve indicated by solid line h which refers to case where an "apodized" objective lens is used in the apparatus of FIG. 3A.

Figure 8:
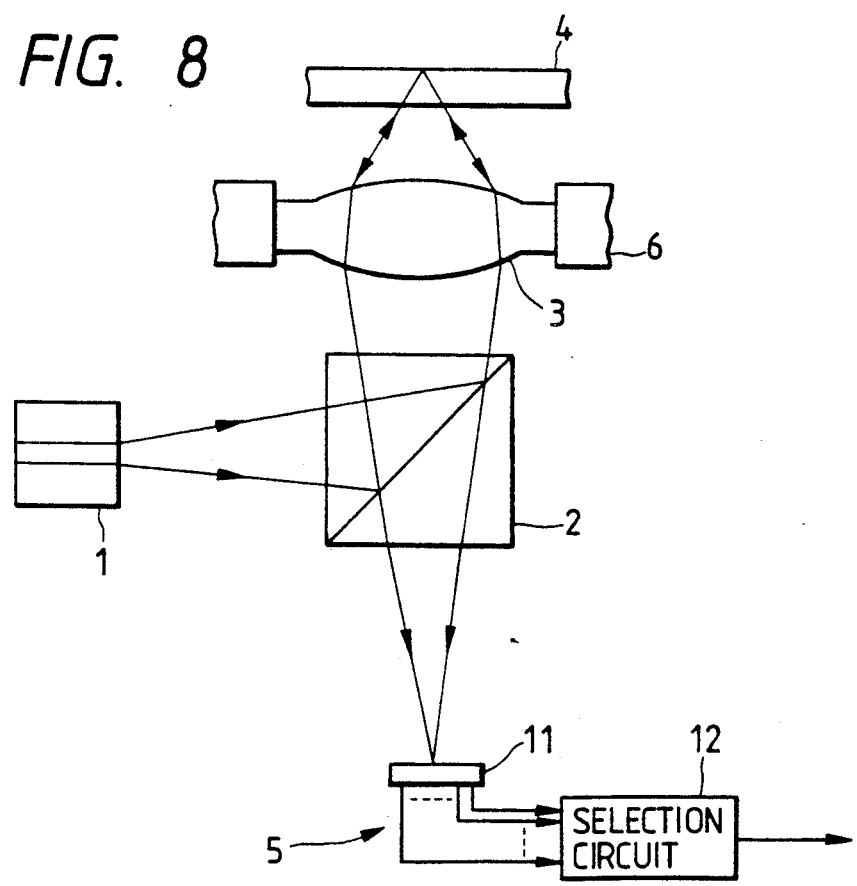
FIG. 8 is a schematic diagram showing an optical information reproducing apparatus according to second embodiment of the present invention.

FIG. 8 is a schematic diagram showing a second embodiment of the present invention. In the apparatus shown, a light source 1, a beam splitter 2, an objective lens 3, a disk 4, a photodetector 5 and an actuator 6 are disposed in the same manner as in the apparatus shown in FIG. 1A. According to the present invention, however, the photodetector 5 comprises a photodetector array 11 which is a row of dot-shaped photoelectric converter elements each having a circular light-receiving surface with a diameter of 2–3 $\mu$m, and a selection circuit 12 that compares the levels of outputs from the individual photoelectric converter elements and which selectively produces an output having the highest level.

In the system shown above, only the output of a photoelectric converter element in photodetector array 11 which receives that portion of reflected light from the disk 4 which corresponds to the main lobe is selectively produced. Consequently, the output level of detection signal can be maintained satisfactorily high in the high spatial frequency range, and in addition, the unwanted component which otherwise would cause crosstalk in the readout signal can also be eliminated. As in the conventional system shown in FIG. 1A, the objective lens 3 may be driven in a direction transverse to disk tracks (i.e., in the radial direction of disk 4) so that the spot of information detecting light will be positioned on a track on the recording surface of the disk 4. Either because of this drive control or because of a time-dependent offset that might occur in the optical axis or in some other reference factor, the position of a beam spot formed on the photodetector array 11 may be altered. However, in accordance with the present invention, information can be read out effectively even under these circumstances and the advantages just mentioned above can be attained.

Figure 9:
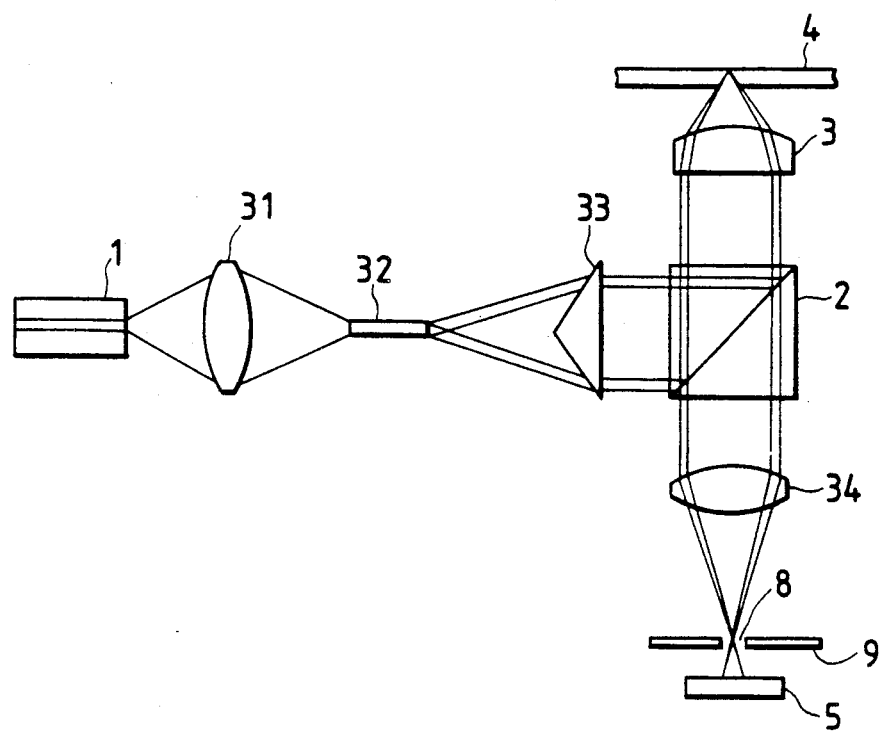
FIG. 9 is a schematic diagram showing an optical information reproducing apparatus according to the third embodiment of the present invention.

FIG. 9 is a block diagram showing an optical information reproducing apparatus according to third embodiment of the present invention. As shown, a light beam issuing from a light source 1 is converged by a coupling lens 31 to be launched into a second harmonics generator (SHG) 32 of a fiber type. As described in Unexamined Japanese Patent Publication Hei-1-93326 and other prior patents, SHG 32 Of a fiber type is so designed as to generate the second harmonic wave of incident light and the wavefronts of second harmonic waves issuing from this SHG provide a conical equiphase surface around the central axis of the fiber. In other words, the SHG 32 of a fiber type emits an annular light beam, with the ring diameter increasing with the distance from the exit surface of said SHG. The SHG 32 of a fiber type can be fabricated by crystallizing a nonlinear optical medium such as DAN(4-(N,N-dimethylamino)-3-acetamidonitrobenzen) that is confined in the core of an optical fiber.

The light beam emerging from the SHG 32 of a fiber type is collimated by a collimation lens 33 in the form of a conical prism having a conical surface. The collimated light is reflected by a beam splitter 2 and converged by an objective lens 3 to be focused on the recording surface of a disk 4 to form a small spot of information detecting light. The light beam emerging from the SHG 32 of a fiber type is annular, and so is the light beam that is launched into the objective lens 3. This annular light beam is converged and reflected from the recording surface of the disk 4. The reflected light from the recording surface of the disk 4 provides an optical signal associated with the information recorded as a cavity, called "pit", in the disk 4 and this optical signal passes through the objective lens 3 and beam splitter 2 to be launched into a condenser lens 34. Thereafter, the reflected light from the recording surface of the disk 4 is converged by the condenser lens 34 and launched into a photodetector 5 through a pinhole 8 formed in a shield plate 9. The photodetector 5 converts the optical signal into an electric signal for reproducing the recorded information. As in the apparatus shown in FIG. 3A, pinhole 8 is formed in the vicinity of a point conjugative with the point at which a spot of information detecting light is formed on the recording surface of the disk 4.

On account of the use of SHG 32 of a fiber type and of the presence of pinhole 8, the optical unit in, the system described above is functionally equivalent to a confocal optical unit having an objective lens with its central portion shielded from light. In other words, the optical unit in the apparatus shown in FIG. 9 is functionally equivalent to the case where one of the two lenses in the confocal optical unit shown in FIG. 4 is subjected to apodization. If the central portion of the objective lens 3 in the optical unit in the apparatus shown in FIG. 9 is shielded from light, said optical unit will become functionally equivalent to the case where both lenses in the confocal optical unit shown in FIG. 4 are subjected to apodization.

Hence, not only in the apparatus shown in FIG. 3A but also in the apparatus shown in FIG. 9, information can be read out with a smaller spot of information detecting light than in the prior art apparatus using an ordinary non-confocal optical unit, thereby increasing image resolution and the output level of readout signal.

Figure 10:
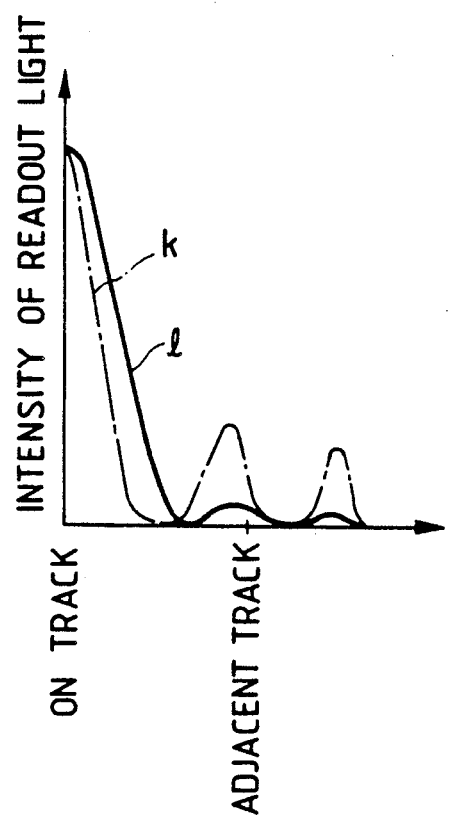
FIG. 10 is a graph showing two types of light intensity distribution that are obtained by illuminating the recording surface of a disk with a laser beam.

In the apparatus shown in FIG. 9, the light in the neighborhood of a beam spot formed on the recording surface of the disk 4 has an intensity distribution as shown by a one-long-and-one-short dashed line k in FIG. 10. Solid line l in FIG. 10 shows the intensity distribution of light which is in the neighborhood of a beam spot formed in an apparatus that does not use a SHG of a fiber type.

As is clear from FIG. 10, the apparatus shown in FIG. 9 which outputs an annular light beam from the SHG 32 of a fiber type produces a slender main lobe (the intensity of light in the vicinity of the central portion) compared to the case where a non-annular light beam having the same wavelength falls on the entire area of the pupil of objective lens 3 but on the other hand, said apparatus produces more intense side lobes, which will pick up information from adjacent tracks to cause crosstalks. In fact, however, the shield plate 9 having pinhole 8 blocks that part of reflected light from the disk 4 which corresponds to these side lobes, to thereby reject the unwanted portion due to crosstalks. Further, the annular light beam emerging from the SHG 32 of a fiber type is converged by objective lens 3, so compared to the focus spot obtained by illuminating the entire part of the pupil of the objective lens with a non-annular light beam having the same wavelength, the diameter of the main lobe will be sufficiently reduced to achieve better resolution.

This advantage, combined with the fact that the apparatus shown in FIG. 9 uses readout light having one half the wavelength of that employed in the prior art optical information reproducing apparatus, contributes to a further improvement in resolution and insures efficient information reading from an optical disk that has information recorded at a density four times as high as in the prior art.

The output characteristics of the apparatus shown in FIG. 9 are the same as those of the apparatus shown in FIG. 3A and are indicated by a two-short-and-one-long dashed line g in FIG. 5. When the objective lens in the apparatus shown in FIG. 9 is subjected to apodization, the resulting output characteristics are the same as those obtained when the objective lens in the apparatus shown in FIG. 3A is subjected to apodization and they are indicated by a solid line h in FIG. 5.

Figure 11:
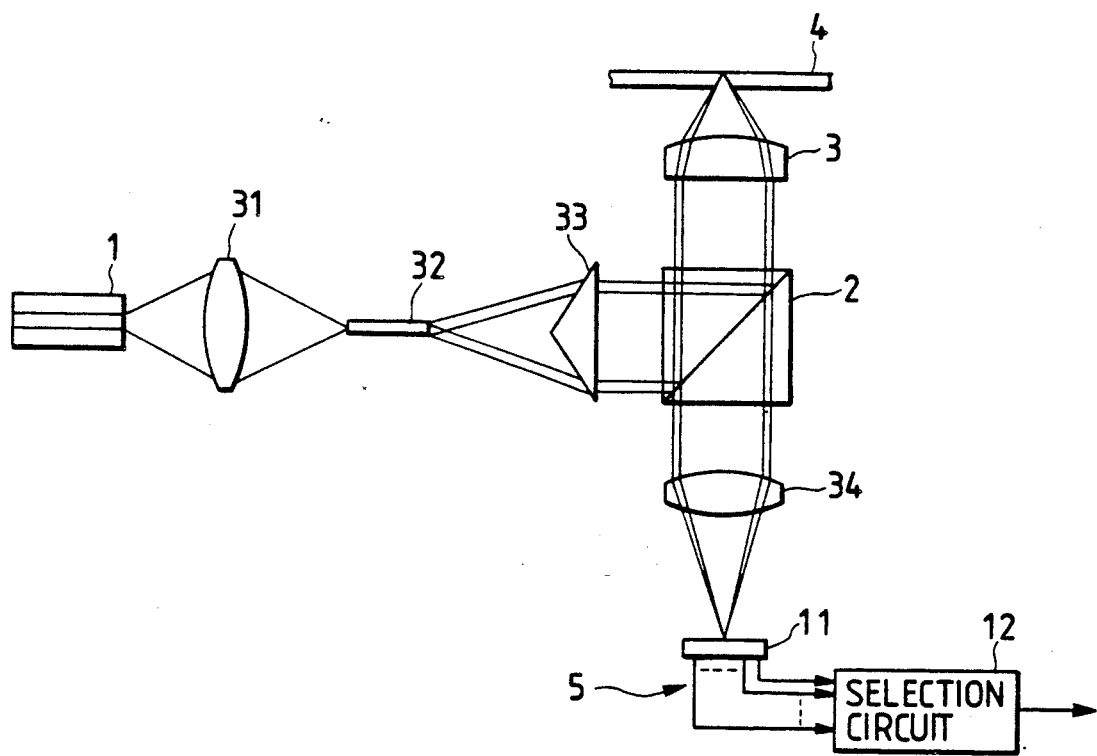
FIG. 11 is a schematic diagram showing an optical information reproducing apparatus according to fourth embodiment of the present invention.

FIG. 11 is a block diagram showing an optical information reproducing apparatus according to yet another embodiment of the present invention. As shown, the apparatus includes a light source 1, a beam splitter 2, an objective lens 3, a disk 4, a photodetector 5, a coupling lens 31, a SHG 32 of a fiber type, a collimator lens 33 and a condenser lens 34, and the layout of these components is the same as in the apparatus shown in FIG. 9. In this embodiment, however, the photodetector 5 comprises a photodetector array 11 which is a row of dot-shaped photoelectric converter elements each having a circular light-receiving surface with a diameter of 2–3 μm, and a selection circuit 12 that compares the levels of outputs from the individual photoelectric converter elements and which selectively produces an output having the highest level. In the system shown above, only the output of a photoelectric converter element in photodetector array 11 which receives that portion of reflected light from the disk 4 which corresponds to the main lobe is selectively produced. Consequently, the output level of detection signal can be maintained satisfactorily high in the high spatial frequency range, and in addition, the unwanted component which would otherwise be caused by crosstalks can also be eliminated. The objective lens 3 may be driven in a direction transverse to tracks (i.e., in the radial direction of disk 4) so that the spot of information detecting light will be positioned on a track on the recording surface of the disk 4. Either on account of this drive control or because of a time-dependent offset that might occur in the optical axis or in some other reference factor, the position of a beam spot formed on the photodetector array 11 may be altered. However, in accordance with the present invention, information can be read out effectively even under these circumstances and the above-mentioned advantages can be attained.

As described above, the optical information reproducing apparatus of the present invention has a small hole disposed on a light path from a recording medium into a photodetector in the vicinity of a point conjugative with the point at which the light from a light source is converged on the recording surface of the recording medium. This permits information to be read out with a small spot of information detecting light, thus ensuring that a detection signal of a satisfactorily high output level can be obtained in the high spatial frequency range. Since the spatial frequency can be increased without reducing the level of output signal, the apparatus of the present invention contributes to high-density recording in an optical disk. Another advantage of the optical information reproducing apparatus of the present invention is that it eliminates that portion of reflected light from the recording medium which corresponds to side lobes in an Airy disk, thereby minimizing the possible crosstalk between adjacent tracks.

In a preferred embodiment, light wavelength converting means by which the light emitted from a light source to illuminate the recording medium is converted to light having one half the wavelength of said emitted light is provided and this is effective in further reducing the diameter of the spot of information detecting light.

If desired, a second harmonics generator (SHG) may be used as the light wavelength converting means so that information is read with an annular light beam which will not permit any light to fall upon the central area of an objective lens. This is also an effective embodiment in that the diameter of focus spot of the information detecting light beam can be reduced.

In a preferred embodiment, the objective lens for converging the reflected light from the recording medium has a smaller light transmittance in the central portion than in the remaining area and this is effective in reducing the diameter of information detecting beam.

In a preferred embodiment, the photodetector includes a plurality of light-detecting elements having a plurality of light-receiving surfaces arrayed in a predetermined direction, and a selection circuit that selectively produces an output having the highest level of the outputs from said plurality of light-detecting elements. In this case, only the output of a light-detecting element which receives that portion of reflected light from the disk which corresponds to the main lobe is selectively produced, thereby ensuring that a detection signal having a satisfactorily high output level is obtained in the high spatial frequency range while minimizing the possible crosstalk between adjacent tracks.

Various modifications within the spirit of the invention will be apparent to those of working skill in this technology. Accordingly, the invention is to be considered as limited only by the scope of the appended claims.

What is claimed is:

1. An optical information reproducing apparatus comprising:
    a photodetector;
    a light source;
    light wavelength converting means by which the light emitted from said light source is converted to light having one half the wavelength of said light from said light source;
    a first optical unit for converging light from said light wavelength converting means at a point on the recording surface of a recording medium,
    a second optical unit for directing light reflected from said recording medium to said photodetector; and
    a shield plate disposed between said first optical unit and said photodetector,
    wherein a small hole is provided in said shield plate in a path of light toward said photodetector in the vicinity of a point conjugative with the point at which the light from said light source is converged on the recording surface of said recording medium.

2. An optical information reproducing apparatus according to claim 1 wherein said light wavelength converting means is a second harmonics generating (SHG) element of a fiber type that is fabricated by crystallizing a nonlinear optical medium confined in the core of an optical fiber.

3. An optical information reproducing apparatus according to claim 8, wherein said first optical unit comprises an objective lens having a smaller light transmittance in a central portion thereof than in the remaining area.

4. An optical information reproducing apparatus according to claim 1, further comprising a collimation lens disposed between said light wavelength converting means and said second optical unit.

5. An optical information reproducing apparatus according to claim 4, wherein said collimation lens comprises a conical prism having a conical surface.

6. An optical information reproducing apparatus according to claim 1, further comprising a condenser lens disposed between said second optical unit and said shield plate.

7. An optical information reproducing apparatus according to claim 1, wherein said second optical unit comprises a beam splitter.

* * * * *